United States Patent [19]

Pfarr, Jr.

[11] 4,154,430

[45] May 15, 1979

[54] CONDUCTIVE INSULATION ELECTRICAL GROUNDING OR CHARGING SYSTEM FOR INSULATION COATED CHAIN LINK FABRIC

[75] Inventor: Walter L. Pfarr, Jr., Towson, Md.

[73] Assignee: Anchor Post Products, Inc., Baltimore, Md.

[21] Appl. No.: 798,772

[22] Filed: Jul. 15, 1977

[51] Int. Cl.$^2$ ........................ H05F 3/02; E04H 17/04; B21F 27/10; A01K 3/00

[52] U.S. Cl. ........................................ 256/10; 109/35; 174/6; 174/84 R; 174/129 R; 219/91.21; 245/8; 256/45; 361/212; 428/255

[58] Field of Search .................. 174/5 SG, 6, 7, 84 R, 174/94 R, 117 M, 129 R, 133 R; 245/1, 2-10; 140/3 A, 6, 7, 9, 10, 11, 112; 256/1, 5, 10, 32, 33, 45, 47, 48; 361/1, 212; 109/35; 340/273, 276; 139/425 R; 428/255, 256; 339/14 L; 219/58, 91, 92

[56] References Cited

U.S. PATENT DOCUMENTS

| | | | |
|---|---|---|---|
| 3,118,048 | 1/1964 | Fisher, Jr. et al. | 219/92 |
| 3,249,686 | 5/1966 | Paar | 174/129 R X |
| 4,031,284 | 6/1977 | Ingraham | 256/10 X |

*Primary Examiner*—Laramie E. Askin

*Attorney, Agent, or Firm*—Walter G. Finch

[57] ABSTRACT

The invention is an improved method for electrical grounding of plastics coated chain link fabric that is usually used for fences or similar enclosures. The invention provides a method for grounding by employing an insulating coating containing conductive particles to form a continuous linkage or electrical path through and between all wires that compose the fabric. The said fabric, after said continuous linkage or electrical path is established, is then grounded at various intervals along the length of the fence or enclosure and thus effectively electrically grounds the fabric.

12 Claims, 3 Drawing Figures

CONDUCTIVE INSULATION ELECTRICAL GROUNDING OR CHARGING SYSTEM FOR INSULATION COATED CHAIN LINK FABRIC

BACKGROUND AND SUMMARY OF THE INVENTION

The invention relates to methods for the electrical grounding of plastics coated chain link fabric, usually used for fences or similar enclosures but not limited to such applications.

There is a need in the various industries using plastics coated chain link fabric, for fences or other applications, to be able to electrically ground the said fabric.

It should be noted that when the term "plastics coated" is used concerning this invention that an insulating material is intended and the use of other insulating materials other than plastics is included within the scope and intent of this invention.

The need for such electrical grounding is for the purpose of eliminating induced voltages, static charges, and other currents which might occur in such a chain link fabric installation.

Certain installations of chain link fabric, such as in fencing, especially those which are installed near transformer, generating, and other electrical equipment, are subject to induced voltages.

Previously, galvanized chain link fences or fences without insulating coatings would be grounded at intervals along the length of the fence, so that these voltages and currents would be eliminated by grounding through known clamps and known grounding systems.

Chain link fabric is formed in a chain-like system where flattened helixes are woven to flattened helixes. When the wire from which the fabric is woven is insulated, there is no grounding from one helix to the next helix.

It should be understood that the use of the term plastics coated is intended to mean any form of insulation where plastics or other material is used. Such other insulating materials are within the scope and intent of this invention.

Once the individual wires in said helix form that comprise the fabric are grounded or inter-connected to the next helix, and thence throughout the fabric until the entire fabric is inter-connected or grounded together, any charge on the fabric is taken to ground by known means. The fabric is effectively electrically grounded along its entire length at periodic intervals.

When a chain link fabric is woven to various heights for use as fencing, the various heights are obtained by adding "diamonds" (the diamond pattern of the woven fabric.)

Standard heights in the industry are normally woven by weaving a specified number of "diamonds" for the desired height. These heights are not woven with an even number of "diamonds", they are woven with a half of a "diamond" in the height. Having the fabric thus woven, the top of one helix connects to the bottom of its adjacent helix and thereon along the length of the fabric.

With the above pattern of weaving the wires are connected, one to the other, at the "twist" or "knuckle" at the top and then a similar connection at the bottom to an adjacent wire. Thus alternating top and bottom the connection moves down the length of the fabric.

By the use of the inter-connecting or grounding method in this invention through the above weaving method, a continuous flow of current can be obtained down the entire length of the fabric segment. Such a continuous flow can draw off or drain off all induced voltages, static charges, and other electrical currents in the fabric. Thus, taken to ground, the fabric, whether as a fence or in any other use, is effectively, electrically grounded.

In this invention, in which the insulation placed on the wires may be a plastics or other insulating material, the material will be described as a plastics material. The plastics coating placed on the fabric wires is a specially made powder coating which is highly filled with a pulverized conductive element such as, but not limited to, aluminum shavings. The powder filled with these conductive shavings is fused onto the wire, most of the particles of the metal are insulated from each other by a thin layer of the plastics or other insulating material. Whenever "metal shavings" is used, "conductive elements" is implied. For example, carbon elements rather than metal shavings may be used.

These highly filled coatings do not provide a conductive continuity. An arc-over must occur between one metal core to the next metal core of the fabric helix wires in order to provide a permanent conductive path between the metal particles and link one metal core to the next metal core.

In the arcing between the conductive particles a conductive path forms through the plastics or other insulating material by actual transformation of the non-conductive materials which takes place. This change creates a "tree" link between the metallic particles. Once this arc-over takes place, a permanent conductive path is set up.

To obtain the arc, a power source is applied to adjacent wire cores of the helixes, applying a voltage of sufficient magnitude to arc across the insulating layers between each of the pulverized conductive material particles in the insulation and thus forming the permanent conductive path which allows for elimination of induced voltages, static charges, and other currents in a structure of insulated chain link fabric.

It is therefore an object of the invention to provide an effective electrical grounding system for plastics or otherwise insulated chain link fabric when used as fencing or for other similar enclosures.

Another object of this invention is to establish the path of said effective electrical grounding system by use of a chemical-electrical method.

It is another object of the invention to provide a method that can be accomplished during the normal fabric weaving procedure.

Further objects and advantages of the invention will become more apparent in light of the following description of the preferred embodiments.

DESCRIPTION OF THE PREFERRED EMBODIMENTS

Figure 1:
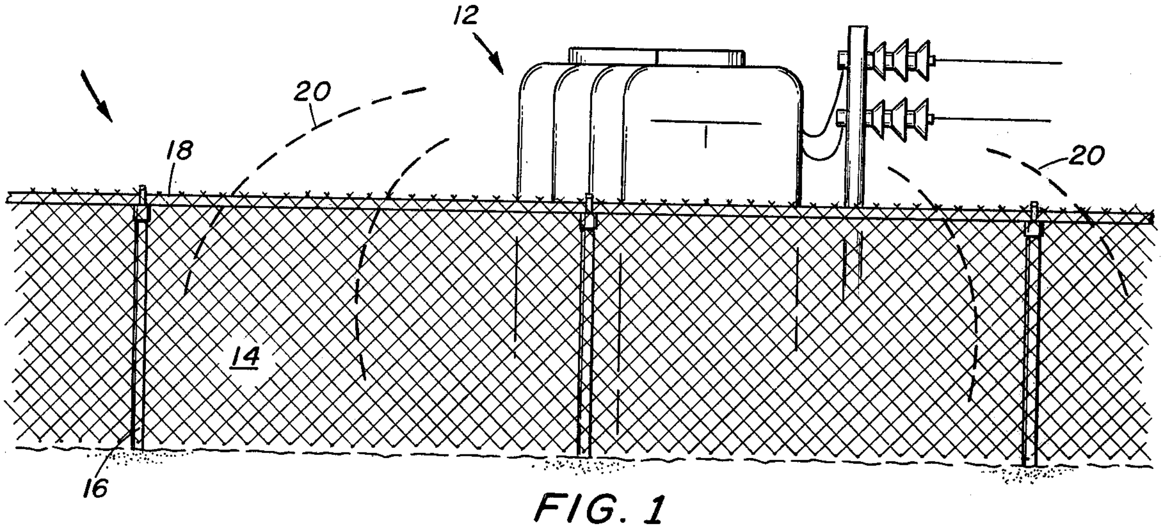
FIG. 1 is a pictorial view showing a typical electrical installation enclosed by a chain link fabric structure made of plastics coated or otherwise insulated wire.

Referring now to the drawings and particularly to FIG. 1, a typical chain link fabric structure 10 is shown, in this case a fence enclosure surrounding a typical electrical installation 12.

The chain link fabric 14 is shown mounted on typical posts 16 with a typical top rail 18.

Shown pictorially in schematic form is a typical electrical field 20 from a typical electrical installation 12 that creates the induced charge, static charge, or other stray electrical currents on the insulated chain link fabric 14. It is these charges or currents that are taken to ground by this invention.

Figure 2:
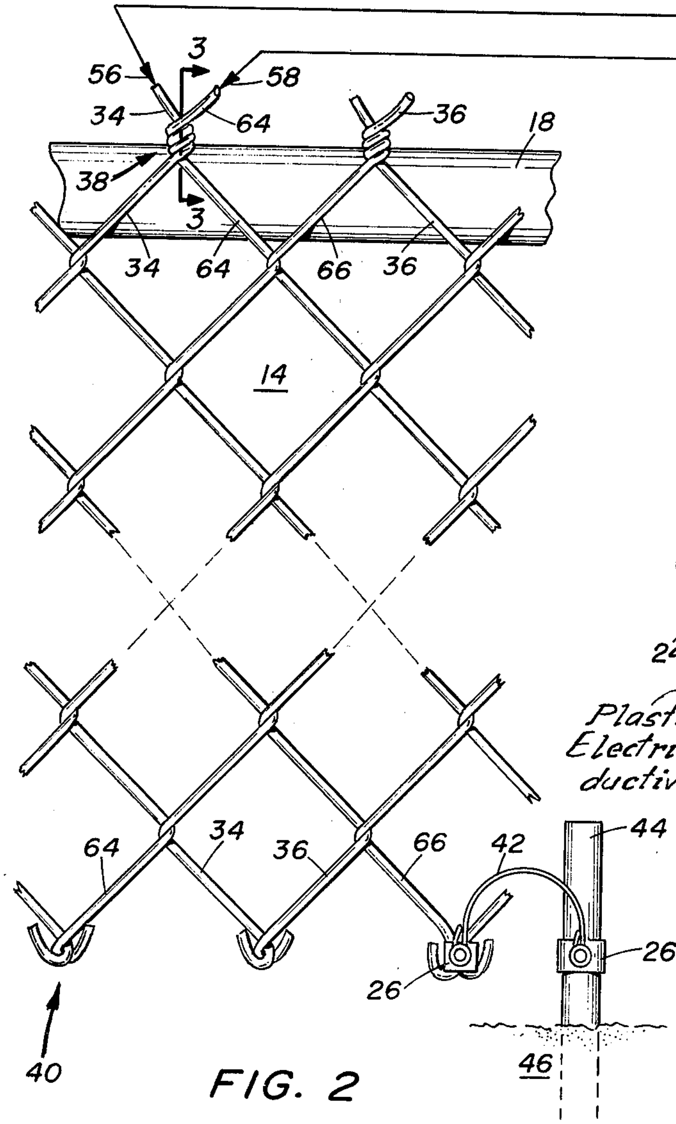
FIG. 2 is a partial view of the chain link fabric in a typical structure showing the manner of applying an electrical charge to the wire strands to establish the electrical path for grounding by the chemical-electrical method.

Turning now to FIG. 2, the chain link fabric 14 is shown in relation to the top rail 18.

In FIG. 2 it can be seen how helix wire 34 in the helix emerges as helix wire 64 at the other end and how likewise, helix wire 36 emerges as helix wire 66 at the other end. Adjacent pairs of helix wires 34 and 64 form twist 38 at one edge and looped or knuckle connection 40 at the other edge. Similar twists and knuckles are formed with adjacent pairs of helix wires 36 and 66.

Once the chain link fabric 14 is woven, each of the conductive wire cores in helix wires 34, 64, 36, and 66 are electrically insulated from each other by the applied insulation.

This invention provides a method for overcoming this insulation as far as the electrical continuity is concerned. The effectiveness of the insulation on a corrosion resisting measure is not altered.

In FIG. 2 it can be seen how a high voltage current of sufficient magnitude is applied to the pairs of helix wires 34 and 64 and 36 and 66. A generating system 60 supplies the necessary magnitude of the high voltage current to cause the arc-over as hereinafter described.

Connection to such pairs of helix wires as 34–64 and 36–66 is shown in FIG. 2 for the pair of helix wires 34 and 64 at the twist 38. The connection 56 to helix wire 34, and connection 58 to helix wire 64 may be made as a direct connection to the wire cores of the helix wires 34 and 64, by prod to each helix wire 34 and 64, or by wire brush-type multiple-prod or probe to the cores of helix wires 34 and 64.

When the high voltage current of sufficient magnitude passes through the core wires of the helix wires 34 and 36 an "arc-over" occurs between helix wires 34 and 36 at the most logical points, which are where they are adjacent to each other.

These arc-over points are in the twist, at helix points where the wires pass around each other and in the knuckle.

When the arc-over occurs, these points are effected because the high voltage current has an assist, in that a shorter path is found between the two conductive wire cores of helix wires 34 and 64 at the aforementioned points. At these points the aforementioned metallic or conductive particles in the insulation each reduces the distance of travel for the arc-over.

As the arc-over occurs, the insulating material between each metallic particle in the insulation is chemically transformed by the arc to an electrically conductive material. Thus, a "tree" is formed that is a conductive path through the insulation from one metal core to the next metal core. This transformation process is a chemical-electrical process which is the basis of this invention.

The twist 38, being a tighter connection than the knuckle 40, is the preferred embodiment, and though not shown in the drawing at the knuckle position, a twist at this location is within the scope and intent of this invention.

Figure 3:
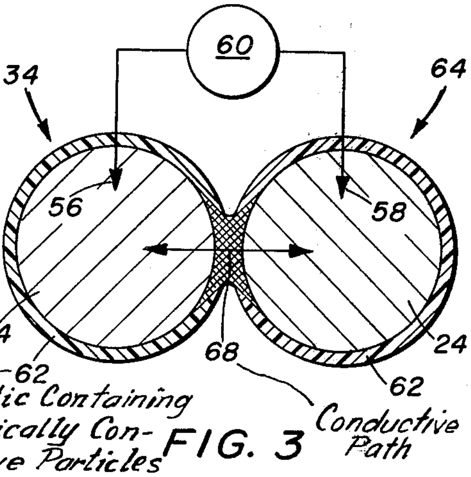
FIG. 3 is an enlarged cross-sectional view taken in the direction of line 3—3 of FIG. 2 showing the electrical grounding path established by the chemical-electrical method.

In FIG. 3 the generating system 60 connections 56 and 58 to the metal cores 24 of helix wires 34 and 64 are shown. The arc-over path 68 through the insulation 62 transforms the insulation 62 at the point of arc-over at 68 to a conductive material as shown.

Once the arc-over 68 occurs, the transformation of the insulation 62 to a conductive material at the arc-over point 68 provides a permanent electrical path between the metal cores 24 of the helix wires 34 and 64.

Once all of the individual helix wires 34, 64, 36, and 66 of the chain link fabric 14 are in continuous electrical contact through the chemical-electrical transformations 68, the chain link fabric 14, as part of a typical enclosure 10, is ready to have any charges or currents associated with the structure collected and conducted to the ground to discharge the structure.

The grounding means to discharge any current or charge on the fabric 14 is shown in FIG. 2. A clip 26 is attached to the knuckle 40 (or a twist 38 if twisted at both edges as aforementioned), a wire 42 from clip 26 is attached to a ground stake 44 by another clip 26, said ground stake 44 having been driven into the earth 46 previously.

Thus, the current or charge in the chain link fabric 14 is conducted from the point of effective electrical connection made by the chemical-electrical process of this invention (such as at a twist 38 or a knuckle 40) through a first clip 26, wire 42, a second clip 26, through ground stake 44 to the earth ground 46 for discharge. Such grounding means are located at spaced intervals along the length of the fabric structure 10.

Thus, the chain link fabric 14 of a typical structure 10 is effectively electrically grounded or discharged by this invention.

If desired, the chain link fabric structure 10 can be maintained in an electrified condition by omitting the final ground connection by wire 42 through ground stake 44 to earth 46 and connecting the chain link fabric structure to the desired source of electrical energy. Thus, such a modified structure can be used for security purposes.

Accordingly, modifications and variations which the invention is susceptible to may be practiced without departing from the scope of the appended claims.

What is claimed is:

1. An electrically interconnected chain link fabric structure and grounding means therefor, comprising:

a chain link fabric formed of a plurality of individual helix type wires each composed of a metallic core covered with electrical insulating material, adjacent wires being interengaged at points along their lengths and being coupled together at their ends;

wire connection means electrically and serially connecting all of the individual wires of said chain link fabric into a continuous conductive wire system, said wire connection means comprising electrically formed electrically conductive links established within said insulating material and forming electrical connections between metallic cores of adjacent wires through said insulating material; and a grounding means electrically connected to said continuous conductive wire system for discharging said continuous conductive wire system.

2. The combination as recited in claim 1 wherein said insulating material contains metallic particles.

3. The combination as recited in claim 2 wherein said electrically conductive links between metallic cores of adjacent helix wires of said chain link fabric are established by a chemical-electrical process of high voltage current arc-over between said metallic cores through said metallic particles in said insulating material at each point of contact between said adjacent helix wires.

4. The combination as recited in claim 3 wherein the couplings at the ends of adjacent helix wires are formed by twisting together the ends of adjacent helix wires, and wherein said points of contact include the points where said adjacent helix wires are twisted together at their ends.

5. The combination as recited in claim 3 wherein the couplings at the ends of adjacent helix wires are knuckle connections joining adjacent helix wires, and wherein said points of contact include the points where said adjacent helix wires are joined by a knuckle connection.

6. The combination as recited in claim 3 wherein each interengagement between adjacent helix wires at points along their lengths is formed by looping adjacent helix wires around each other, and wherein said points of contact include the points where said adjacent helix wires loop around each other.

7. The combination as recited in claim 3, wherein said high voltage current arc-over is provided by a current generating system of high voltage capacity applied through contacts at the metallic core ends of said adjacent helix wires.

8. The combination as recited in claim 3 wherein said electrically conductive links in collective combination with all said metallic cores of all said adjacent helix wires constitute said wire connection means that electrically and serially connects all of the individual wires of said chain link fabric into a continuous conductive wire system.

9. The combination as recited in claim 1 wherein said grounding means consists of at least one ground connection connected to a point on the continuous conductive wire system along the length of said chain link fabric structure.

10. The combination as recited in claim 1, and further including a plurality of spaced, upright supports, said chain link fabric structure being stretched between said supports and fastened thereto so as to constitute a fence; and said grounding means comprising at least one ground connection connected to said continuous wire system at a point along the length of said chain link fabric and terminating in the earth to ground the entire fence.

11. An electrically interconnected chain link fabric structure and charging means therefor, comprising: a chain link fabric formed of a plurality of individual helix type wires each composed of a metallic core covered with electrical insulating material containing metal particles, adjacent wires being interengaged at points along their lengths and being twisted together at their ends; wire connection means electrically and serially connecting all of the individual wires of said chain link fabric into a continuous conductive wire system;

said wire connection means comprising electrically conductive links between metallic cores of adjacent helix wires established by a chemical-electrical process of high voltage current arc-over between said metallic cores through said metal particles in said insulating material, said conductive links being located at points of contact of adjacent helix wires, including where the wires are twisted together at their ends; and means connected to said continuous conductive wire system for charging said continuous conductive wire system, said means for charging being located near said structure of chain link fabric and being electrically connected to said continuous conductive wire system by an electrical conductor.

12. The combination as recited in claim 11, and further including a plurality of spaced, upright supports, said chain link fabric structure being stretched between said supports and fastened thereto so as to constitute a fence; said fence, when charged by said charging means, serving as a security fence.

* * * * *